United States Patent
Peckham et al.

[11] Patent Number: 5,117,362
[45] Date of Patent: May 26, 1992

[54] PATH CAPTURE FORCING FUNCTION GENERATOR FOR AIRCRAFT VERTICAL AXIS CONTROL

[75] Inventors: Roger D. Peckham, Glendale; Michael R. Kelley, Scottsdale, both of Ariz.

[73] Assignee: Honeywell, Minneapolis, Minn.

[21] Appl. No.: 451,409

[22] Filed: Dec. 15, 1989

[51] Int. Cl.$^5$ .................. B64C 13/18; G05D 1/06
[52] U.S. Cl. ........................... 364/433; 244/181; 244/186
[58] Field of Search ........... 364/433, 435, 428, 427, 364/434, 602, 607; 244/181, 186; 73/178 T, 179

[56] References Cited

U.S. PATENT DOCUMENTS

| | | |
|---|---|---|
| 4,377,848 | 3/1983 | Flannigan et al. .................. 364/433 |
| 4,413,320 | 11/1983 | Brandau et al. ..................... 364/428 |
| 4,709,336 | 11/1987 | Zweifel ............................... 364/433 |
| 4,862,372 | 8/1989 | Appleford .......................... 364/433 |

Primary Examiner—Thomas G. Black
Attorney, Agent, or Firm—Seymour Levine; Dale E. Jepsen; Albin Medved

[57] ABSTRACT

A path capture forcing function generator utilizes integrations from an initial altitude rate error signal and an initial altitude error signal to provide an altitude rate signal and an altitude signal which are compared to the altitude rate error and altitude error signals to provide path rate error and path error signals to the autopilot. In the process of providing the altitude rate and altitude error signals an altitude acceleration signal is established which is used as a feed forward predictor for expected normal acceleration of the aircraft.

25 Claims, 5 Drawing Sheets

PATH CAPTURE FORCING FUNCTION GENERATOR FOR AIRCRAFT VERTICAL AXIS CONTROL

BACKGROUND OF THE INVENTION

1. Field of the Invention

The invention pertains to the field of aircraft flight control and more specifically to the automatic control of the vertical axis trajectory during a path capture maneuver.

2. Description of the Prior Art

Generally the performance of a vertical axis path capture entails maintaining or establishing an acceptable closure rate which is within aircraft performance limits, accommodating late system engagement by the flight crew, limiting all maneuvers to accelerations within the passenger comfort range, and designing a closed loop control system which is stable with minimum overshoot.

In a Flight Management System (FMS) the problem is aggravated by the requirement to track a curved path approximated by a series of short, straight segments. During a capture maneuver, it is actually required that the system "look ahead" to determine if it should be attempting to capture a downstream path segment.

Predominantly, the prior art solved the problem by implementing three control modes and associated control mode switching logic; a vertical speed mode for those special instances where establishing an acceptable path closure rate is required, a path capture mode which executes the capture maneuver, and a path hold mode for controlling the airplane on the straight path. In some implementations, a non-linear path capture control law was used to cause a constant acceleration capture rather than an exponential capture characteristic of linear controllers. This concept satisfied the need to control normal acceleration during capture maneuvers but created stability problems within the closed loop. Control mode switching logic was complex in order to handle all the special cases, such as insufficient path closure rate and late pilot engagement. Control mode switching logic is especially complex in a FMS.

Additionally, the prior art systems provided marginal control stability of the nonlinear control law used in the constant acceleration capture maneuver. The capture maneuver was designed with a fixed acceleration command which made variable "g" captures impossible. Multiple control laws required excessively complicated logic to select the controllers as well as to initialize them. With the lack of variable "g" captures along with the inability to "look ahead" during multiple segment tracking, airplane performance was substandard under all but the most nominal conditions.

One prior art concept applies a forcing function generator to the autopilot for capturing altitudes. This is implemented with a linear, second order filter which adjusts the natural frequency and damping factor to control capture performance. However, no constant acceleration command capability, built-in acceleration or position limiting is provided.

SUMMARY OF THE INVENTION

A path capture forcing function generator in accordance with the present invention augments a stable, linear control law in the closed loop control of the vertical axis. All non-linearities are isolated to the forcing function which is separate from the closed loop. The forcing function defines the path in space as a function of initial position and time. This generator performs a capture at any chosen "g" level depending on the application and condition. With only one forcing function generator augmenting only one closed loop feedback control law, the complexity and timing aspects of the switching logic is significantly reduced.

The invention consists of an open-loop forcing function generator which drives a linear path hold control law during the entire path capture and hold process. The forcing function generator is self-contained in that once initialized to current airplane conditions, it commands the airplane to fly a path in space from capture to hold with no mode changes required. This includes all off-nominal conditions such as late engagement and insufficient closure rate. The key element in the invention is a non-linear, second order filter which produces constant normal acceleration/limited vertical speed commands during its decay from an initialized state.

Integrations from an initial altitude rate error and an initial altitude error provide an altitude rate error and an altitude error for the desired trajectory which are compared to the altitude rate error and altitude error of computed by the Flight Management Computer (FMC) in the FMS to establish a path rate error and path error which, with a predicted trajectory supplied by the forcing function generator, provides the pitch attitude command to the aircraft. Each previously provided altitude rate error and previously provided altitude error pair from the forcing function is utilized to establish a multiplier for the altitude error of a subsequent altitude rate error and altitude error pair and a predicted trajectory. The process continues until the computed altitude rate error and computed altitude error pair and predicted trajectory achieve zero values, whereafter the FMC provided altitude rate errors and altitude errors solely control the aircraft.

DESCRIPTION OF THE PREFERRED EMBODIMENTS

Figure 1:
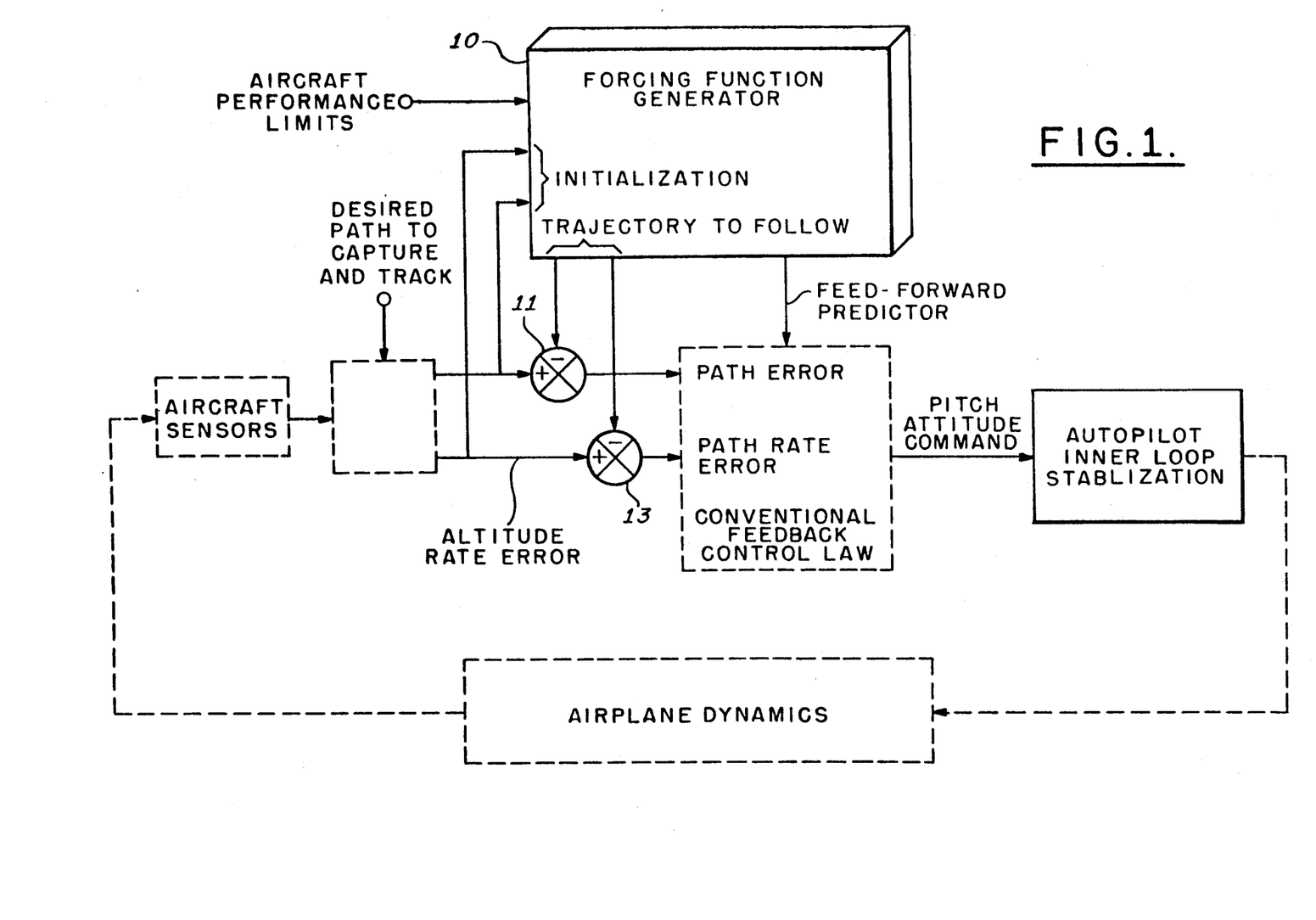
FIG. 1 illustrates the location of the forcing function with respect to the autopilot in a typical outer loop vertical axis feedback arrangement.

As illustrated in FIG. 1 a path capture forcing function generator 10 is initialized to the altitude error and altitude error rate conditions, with respect to the target path, provided by the flight management computer (FMC) at the start of the capture maneuver. Also coupled to the forcing function generator 10 are aircraft performance limits employed to establish velocity limits and initial acceleration limits utilized by the forcing function generator during the path capture run. During normal operation, the capture start point is defined as the altitude at which a constant normal acceleration maneuver of predetermined magnitude will position the aircraft tangent to the target trajectory. Path position and the path rate of the forcing function are coupled to the comparators 11 and 13, respectively, wherein comparisons of the altitude error and altitude rate error, supplied by the autopilot, are performed to establish the path error and path rate error coupled to the conventional feedback control law circuitry of the autopilot. The forcing function then balances the errors generated by the path hold loop at the capture start point as a result of the initialization process. For the duration of the capture maneuver, the forcing function generator 10 programs the error signals generated therein, as a function of time, in a manner which causes the autopilot to provide constant normal acceleration commands to the aircraft. A predictive term, corresponding to expected normal acceleration, is also output from the function generator. This term is used to command a calculated pitch rate commensurate with the desired trajectory, thereby minimizing off path error build-up. If the system is armed for late capture so that a constant normal acceleration maneuver will overshoot the desired path, the forcing function generator will command a constant normal acceleration maneuver which establishes a legitimate capture condition from the opposite side of the desired path. In both cases, altitude rate command limits are imposed to bound the maneuver between minimum capture rate and maximum flight path angle constraints.

Figure 2:
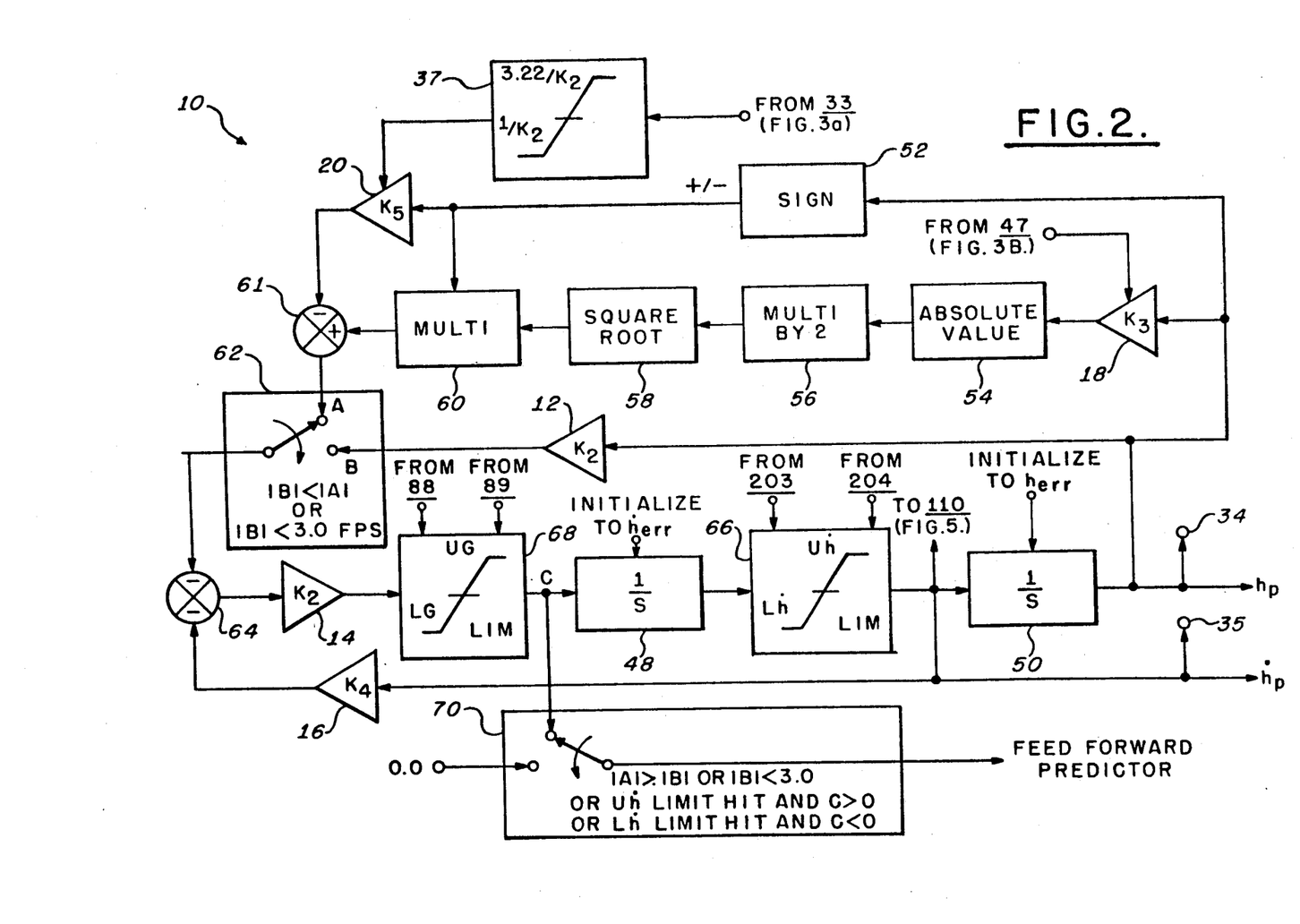
FIG. 2 is a block diagram of the preferred embodiment of the invention.

A block diagram of an open loop second order filter which may be utilized for the forcing function generator 10 is shown in FIG. 2. Amplifier 12 in this circuit provides a constant amplification $K_1$ while amplifiers 14 and 16 provide constant amplifications $K_2$ and $K_4$, respectively. These constants have been empirically derived to establish the filter time constants required to provide the desired flight path trajectory. As will become evident, the constant $K_1$ provides a unit transformation from altitude to altitude rate, the constant $K_2$ provides a unit transformation from altitude rate to acceleration, while the constant $K_4$ is dimensionless. Also included in the circuit is the amplifier 18 having a variable gain $K_3$ which is provided by continuous computations and amplifier 20 having a gain $K_5$ which is computed on initialization of the forcing function generator and thereafter remains constant throughout the run.

Figure 3A:
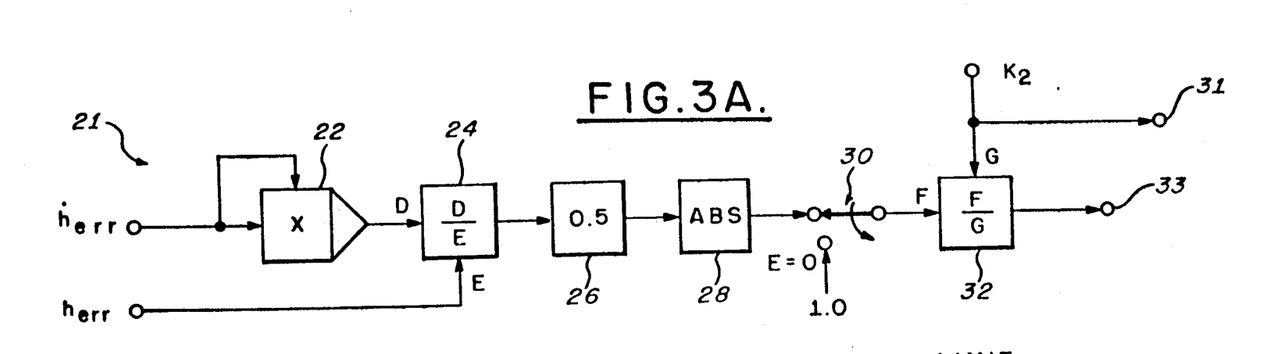
FIGS. 3A and 3B are block diagrams of circuits which may be utilized to calculate the gains of amplifiers used in the circuit of FIG. 2.

Refer now to FIG. 3A wherein a block diagram of a circuit 21 for computing the amplification constant $K_5$ is shown. At the initialization of the forcing function the altitude rate error $h_{err}$ dot relative to the desired path is coupled from the FMC to a squaring circuit 22 and therefrom to a divider 24 to which the altitude error $h_{err}$ relative to the desired path is also coupled from the FMC to provide a signal representative of $[h_{err} \text{ dot}]^2/h_{err}$. This quotient representative signal is coupled through a divide by two circuit 26 to an absolute value circuit 28 wherefrom a signal representative of the absolute value is coupled to a second divider circuit 32 for division by the constant signal $K_2$ coupled from terminal 31. It should be apparent that the signal at the output of the absolute value circuit 28 has dimensions of acceleration. As previously stated the constant $K_2$ provides a unit conversion from velocity to acceleration. Consequently, the division of the signal coupled from the absolute value circuit 28 by the constant $K_2$ provides a signal at the terminal 33 that has units of velocity. To avoid division by zero a switch 30 is actuated to provide a unit signal should the altitude error $h_{err}$ be equal to zero.

Refer again to FIG. 2. The velocity representative signal at the terminal 33 is coupled to a limiter 37 which may have a lower limit provided by the reciprocal of $K_2$ and an upper limit of 3.22 divided by $K_2$. The output of amplifier 20 represents the pitch up/down bias necessary to force the acceleration integrator 48 toward zero during the time the non-linear feedback loop is in use (i.e. switch 62 in its "A" position). The values of 3.22 and 1.0 represent comfort acceptable acceleration values derived from 32.2 ft/sec/sec times the acceleration boundaries of 0.1 g and 0.031 g, respectively.

The output of the limiter, which is a signal representative of the constant $K_5$, is coupled to the amplifier 20 to establish a gain therefor equal to $K_5$.

Figure 3B:
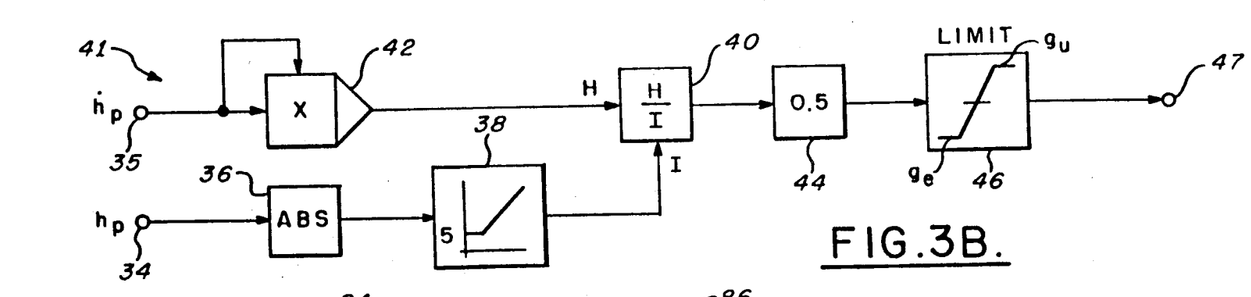

The gain $K_3$ at the amplifier 18 is continuously adjusted throughout the run and is established by the circuit 41 shown in FIG. 3B. This circuit receives the altitude of the path provided by the forcing function generator $h_p$ and the altitude rate of the path provided by the forcing function generator $h_p$ dot provided at the terminals 34 and 35, respectively, and processes these signals in the same manner as the processing of the signals representative of $h_{err}$ and $h_{err}$ dot. In the circuit of FIG. 3B the absolute value of the signal $h_p$ is provided from an absolute value circuit 36 and coupled to a limiter 38 which has a lower limit of five feet but no upper limit. The output of the limiter 38 is the divisor for a dividing circuit 40, the numerator of which is $h_p$ dot provided by a squaring circuit 42. A divide by two circuit 44 receives the quotient from the dividing circuit 40 and couples a signal to a limiter 46 having an upper limit $g_u$ which may be equal to 3.22 ft/sec$^2$ (0.1 g) and a lower limit $g_l$ which may be equal to 1.0 ft/sec$^2$ (0.031 g). The output signal of the limiter 46, which has dimensions of acceleration, is coupled to the amplifier 18 via the terminal 47 to establish the gain $K_3$.

Refer again to FIG. 2. At the capture start point integrator 48 and integrator 50 in the forcing function generator 10 are initialized to $h_{err}$ dot and $h_{err}$, respectively. At this time $h_p$ is equal to $h_{err}$, $h_p$ dot is equal to $h_{err}$ dot, and the feed forward predictor signal then from the forcing function generator 10 is equal to zero. The values of $h_p$ and $h_p$ dot are coupled to the circuit 41 which then sets the gain of amplifier 18 to $K_3$ for the next calculation frame. After the first integration by integrator 50 the resulting $h_p$ is coupled to the amplifier 18 and to a sign determining circuit 52. Amplifier 18 is coupled to an absolute value taking circuit 54, wherefrom a signal representative of the absolute value of $h_p$ is multiplied by 2 in multiplier 56. Signals representative of the absolute value multiplied by 2 are coupled to a square root circuit 58 which provides a signal representative of the square root of the absolute value multiplied by 2. This square root representative signal is then multiplied in multiplier 60 by the sign of $h_p$ provided by the sign taking circuit 52. It should be recognized that the circuit composed of amplifier 18, absolute value circuit 54, multiplier circuit 56, square root circuit 58, and multiplier circuit 60 provide the functional relationship between the altitude $h_p$ and an altitude rate $h_p$ dot corresponding to the altitude $h_p$. A unit signal having the sign of $h_p$ is coupled to amplifier 20 wherefrom a signal of amplitude $K_5$, which as previously stated is a constant having dimensions of altitude rate, is coupled to adder circuit 61 wherein it is subtracted from the altitude rate signal coupled from multiplier 60.

Amplifier 20 provides a reference velocity signal to which the velocity signal from the multiplier 60 is compared in difference circuit 61 to provide a velocity representative signal which is the difference between the reference velocity signal and the velocity signal from the multiplier 60. When switch 62 positioned to couple the signal at terminal A to one input of a summation circuit 64, the difference signal from circuit 61 is added to a velocity representative signal coupled from the integrator 48 via a limiter 66 and an amplifier 16. The negative sum of these two velocities is coupled through amplifier 14 wherein it is multiplied by the constant $K_2$, which as previously stated provides a conversion factor from velocity to acceleration, to couple an acceleration representative signal to a limiter 68. Signals at the output of limiter 68 are coupled to the integrator 48 and therefrom through limiter 66 to provide a velocity representative signal to the amplifier 16 and to the integrator 50 which provides the signal representative of the frame computed altitude $h_p$. With switch 70 positioned to be coupled to the output of the limiter 68, the acceleration representative signal provided thereat is coupled to the autopilot as the feed forward predictor previously discussed with respect to FIG. 1.

The second order loop described above provides an altitude $h_p$ which decays linearly with time. This non-linear path capture filter eliminates the need for a path capture mode and other special modes used in the prior art to maneuver the aircraft to the path capture mode when the airplane is engaged within the vicinity of the path. This filter also creates a non-linear constant load factor function that may be used to drive a linear path tracking loop. Further, there is no capture zone for the filter, thus permitting all maneuvers, no matter how small, to be controlled.

Figure 4:
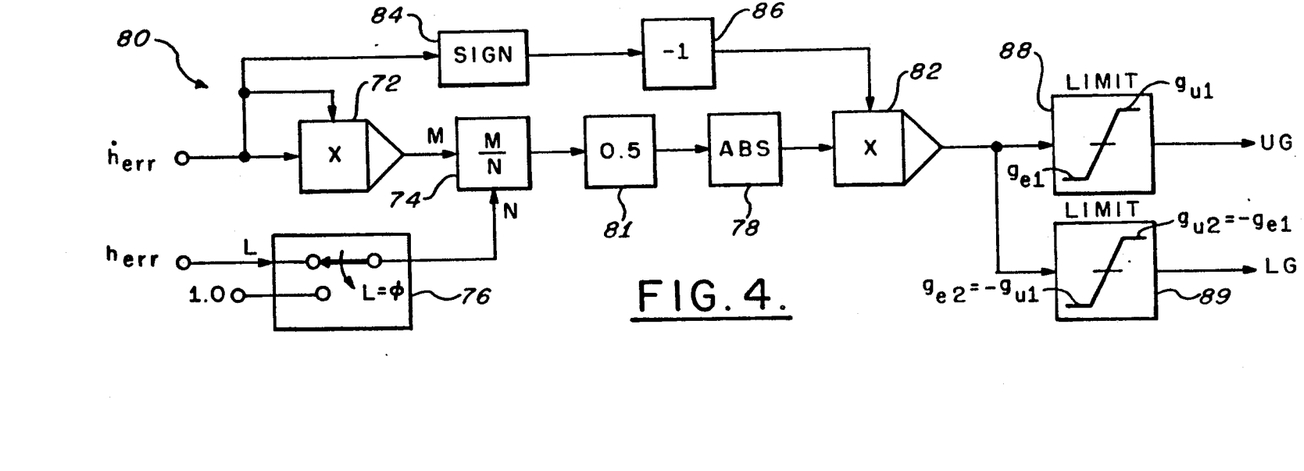
FIG. 4 is a block diagram of a circuit which may be utilized to establish the upper and lower vertical acceleration command limits calculated only at the initialization of the forcing function generator.

Refer now to FIG. 4, wherein a circuit 80 for establishing an upper limit UG and a lower limit LG for the limiter 68 is shown. These limits are computed only upon initialization of the forcing function generator and are the limits for the feed forward predictor. The $h_{err}$ dot provided by the FMC at the initialization of the forcing function generator is coupled to a squaring network 72 wherefrom a signal representative of $h_{err}$ dot squared is coupled as the numerator M for a dividing network 74 to which the altitude $h_{err}$, provided by the autopilot at the initialization of the forcing function generator, is coupled through a switch 76 as the denominator N. To prevent division by zero switch 76 is activated when L is equal to zero to provide a signal of unity level as the denominator of the divider 74. The output signal from the divider 74 is coupled to an absolute value circuit 78 after division by two in a divider circuit 81. The signal representative of the absolute value of the altitude rate squared divided by twice the altitude is coupled to a multiplier 82 to which a signal representative of the inverted sign of $h_{err}$ dot, coupled through the sign taking network 84 and the sign inverter 86, is also coupled. Signals provided by multiplier 82 are coupled to limiters 88 and 89. Limiter 88 has an upper limit $gu_1$ and a lower limit $gl_1$, while limiter 89 has an upper limit $gu_2$ which is equal to $-gl_1$ and a lower limit $gl_2$ which is equal to $-gu_1$. $gu_1$ and $gl_1$ may be equal to 3.54 and 1.1, respectively. When the signal from the multiplier 82 is positive the upper limit UG for the limiter 68 is between the limits $gu_1$ and $gl_1$ while the lower limit of the limiter 68 is $gu_2$. Similarly, the lower limit LG for the limiter 68 is between the limits $gu_2$ and $gl_2$ and the upper limit $u_G$ is set at $gl_1$ when the signal coupled from the multiplier 82 is negative. These limits are set at the initialization of the force function generator and remain constant throughout the run.

When the forcing function generator 10 is initialized $h_{err}$ dot may not be within the desired altitude rate limits. To accommodate such a situation, the limits of limiter 66 are set to the initial altitude rate provided by the autopilot and thereafter varied in accordance with the altitude rate $h_p$ dot provided by the forcing function generator. Generally, $h_p$ dot continuously decreases to zero. This may not occur should the capture command be given late. In such a situation the altitude rate may initially increase to a maximum that is determined by the lateness of the command and thereafter decay to zero. When this occurs the adaptive limit circuitry maintains the initial limits set until the altitude rate provided by the forcing function generator begins to decrease, whereafter the limits track $h_p$ dot until it is within the desired limits for the maneuver, whereafter the limits are fixed at these desired limits. Limit setting circuitry 90, including logic and switching, for providing the limits for the limiter 66 of FIG. 2 is shown in FIG. 5.

Figure 5A:
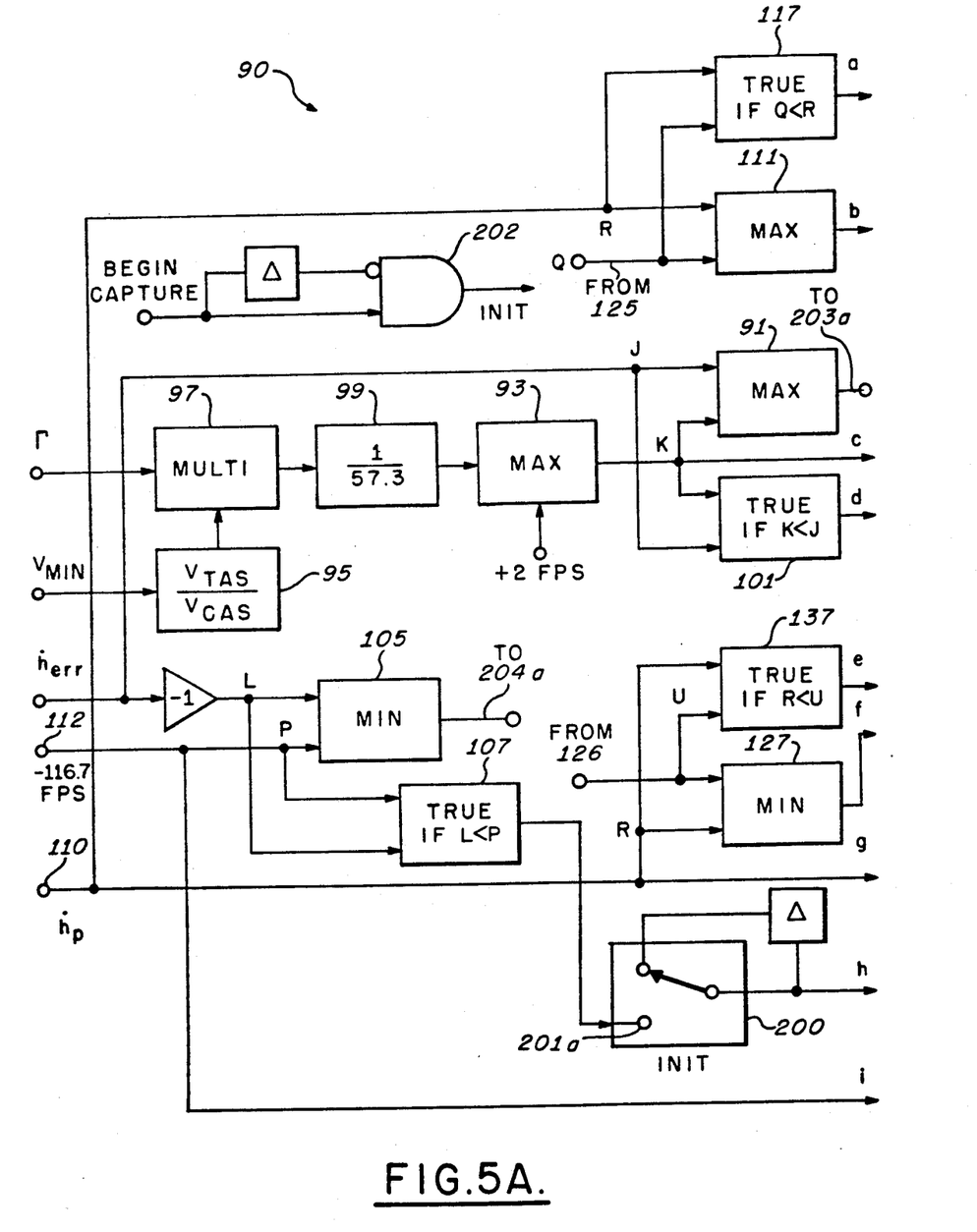
FIGS. 5A and 5B are block diagrams of circuitry which may be utilized to establish the upper and lower altitude rate command limit values during the run time of the forcing function generator.
Figure 5B:
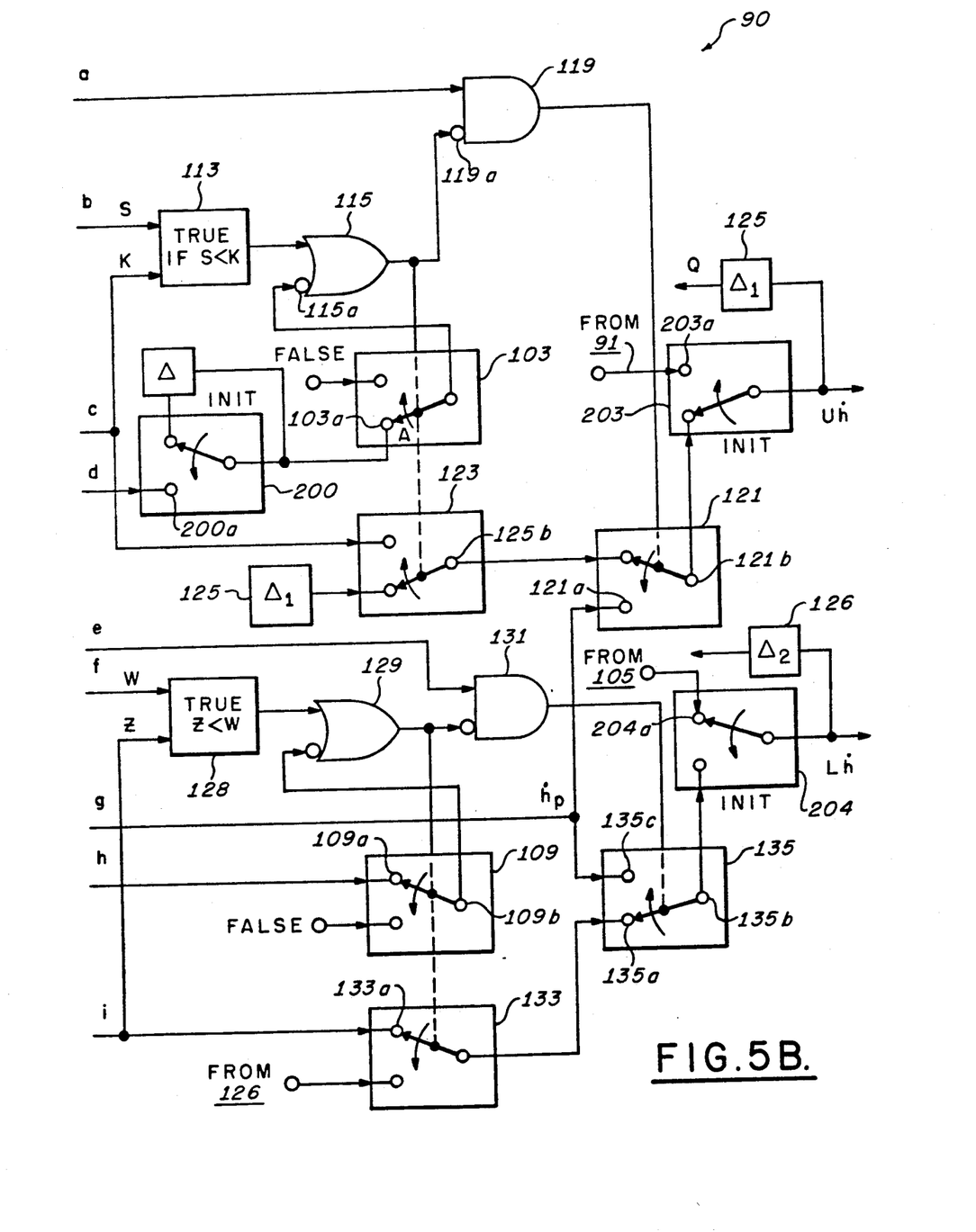

FIG. 5 contains both the initialization and run-time portions of the logic necessary to compute the upper and lower limits $U_h$ dot and $L_h$, respectively. The initialization phase occurs when the capture maneuver just begins. At this point, the logic state "INITIALIZE" goes true for the first computational frame as defined by AND gate 202. This "INITIALIZE" logic state drives switches 203 and 204, and controls the sample and hold circuits 200 and 201. The initialization phase defines four values: a) $U_h$ dot, b) $L_h$ dot, c) sample and hold circuit 200 logic result for $U_h$ dot computation, and d) sample and hold circuit 201 logic result for $L_h$ dot computation. At initialization the altitude rate $-h_{err}$ dot, provided by the FMC is coupled to a maximum determining circuit 91 wherein it is compared to a signal representative of an altitude rate provided by the maximum determining circuit 93 to provide an initial upper limit $U_{hi}$ dot via switch 203. The signal provided by the maximum determining circuit 93 is the maximum between two feet per second or the altitude rate of the aircraft flying at its minimum operating speed $V_{min}$ and maximum possible flight path angle relative to the horizontal gamma ($\Gamma$). The signal representative of the minimum aircraft speed $V_{min}$, having units of calibrated air speed, is coupled to a conversion circuit 95 wherein it is multiplied by the ratio of true airspeed $V_{TAS}$ and calibrated airspeed $V_{CAS}$. Conversion circuit 95 couples a signal representative of the true minimum airspeed for the aircraft to the multiplying circuit 97 wherein it is multiplied by a signal representative of the maximum flight path angle $\Gamma$, given in degrees. A signal resulting from this multiplication is coupled from multiplier 97 to a divider network 99 wherein it is divided by 57.3 to establish a signal representative of $V_{min} \sin \Gamma$, which is a signal representative of the altitude rate of an aircraft defined at its minimum speed and maximum flight path angle. The signals at J and K, which are respectively the signals representative of the altitude rate provided by the FMC at the initialization of the flight forcing function generator and the altitude rate of an aircraft flying at its minimum speed and maximum flight path angle $\Gamma$, are coupled through logic circuit 101 wherefrom a high level logic signal is coupled to terminal A of the sample and hold circuit 200 when the signal at J is greater than the signal at K. The sample and hold circuit 200 retains this logical value for the remainder of the capture maneuver. The value is applied to terminal "A" of switch 103.

The lower limit $L_h$ dot is initially set by comparing a signal representative of $-h_{err}$ dot and an empirically chosen altitude rate, which may be $-116.7$ feet per second (FPS), provided at terminal 112 in the minimum determining circuit 105. Circuit 105 provides the initial value of $L_h$ dot via the switching circuit 204. The signals $-h_{err}$ dot and $-116.7$ FPS are coupled to a comparator 107 wherefrom a high level logic signal is coupled to terminal "a" of the sample and hold circuit 201. The sample and hold circuit 201 provides a logical value to terminal 109a of switch 109 during the run-time operation of the capture maneuver.

The past value indicator 125 provides $U_h$ dot to the present computational frame to couple into comparator 111 wherefrom the signal representative of the maximum of the two is coupled to a comparator 113 which provides a high level logic signal to an OR gate 115 when the signal from comparator 93 is greater than the signal from comparator 111. OR gate 115 has an inverting terminal 115a coupled to the output of the switch 103. The signal representative of hp dot and the past value of Uh dot are also coupled to a comparator 117, which provides a high level logic signal to AND gate 119 when hp dot is greater than the past value of Uh dot. AND gate 119 has an inverting terminal 119a coupled to the output terminal of the OR gate 115. A switch 121, having one input terminal coupled to receive hp dot and a second input terminal coupled to the output terminal of a switch 123 and an output terminal coupled to provide Uh dot to switch 203, is activated by a high level logic signal from the AND gate 119 to couple hp dot at the input terminal 121a to the output terminal 121b, when a low level signal is provided by the AND gate 119. Switch 123 has an input terminal coupled to receive a signal representative of the altitude rate of the aircraft flying at its minimum speed $V_{min}$ and maximum flight path angle and a second input terminal coupled to receive the past value of $U_h$ dot. Assume that the initialized output of sample and hold circuit 200 is true which provides a high level signal to the input terminal A of switch 103. Further assume that past value of Uh dot is greater than or equal to hp dot so that a low level logic signal is coupled to the AND gate 119 from the comparator 117. This condition causes the output terminal of the switch 123 to be coupled through to the output terminal of 121b. Since the past value of Uh dot has been assumed to be greater than hp dot and greater than signal K, which is the output from the maximum determining circuit 93, a logic signal coupled from the comparator 113 is at low level thereby providing a low level signal at the output terminal at the OR gate 115. This low level signal causes the switch 123 to couple the output terminal 123b to the past value of Uh dot via 125 thereby providing a constant $U_h$ dot upper limit value. This condition will prevail as long as $U_h$ dot is greater than hp dot and greater than signal K. If signal K exceeds the maximum of Uh dot and hp dot, a high level signal is provided from the comparator 113 to the OR gate 115 causing the switch 103 to couple to the low level signal at the terminal 103a and thereby provide a low level signal to the inverting terminal 115a of the OR gate 115 causing a high level signal to appear at the output terminal of OR gate 115. This high level signal causes the output terminal 123b of the switch 123 to couple to the input terminal 123a thereby providing the signal at the output of the maximum determining circuit 93, which is the altitude rate for the aircraft flying at its minimum airspeed and maximum possible flight path angle, as the upper limit Uh dot for the limiter 66. The high level signal at the output of OR gate 115 latches the switches and maintains the upper limit as the altitude rate computed by the aircraft's minimum airspeed and its maximum possible flight path angle.

Assume now that $h_p$ dot is greater than both $U_h$ dot and K, the signal representative of altitude rate of the aircraft flying at its minimum speed $V_{min}$ and maximum flight path angle. Under these conditions comparator 117 provides a high level signal to the AND gate 119 while the comparator 113 provides a low level signal to the OR gate 115. Assume also that J, $-h_{err}$ dot provided by the FMC at the initialization of the forcing function generator 10 had exceeded the altitude rate K. This provides a high level signal from sample and hold circuit 200 coupled through the switch 103 to the inverting terminal of the OR gate 115 so that a low level signal is coupled to the inverting terminal of the AND gate 119 thereby providing a high level signal at the output and causing the switch 121 to couple the signal representative of the altitude rate $h_p$ dot as the upper limit Uh dot for the limiter 66. This situation continues until $h_p$ dot becomes less than the altitude rate K of the aircraft flying at its minimum speed and maximum flight path angle. At this time the comparator 113 provides a high level signal to the OR gate 115 causing the the switch 123 to couple the output terminal of the maximum determining circuit 93 to the output terminal 123b. The high level signal at the output of OR gate 115 is also coupled to the inverting terminal of the AND gate 119 creating a low level signal at the output terminal of the AND gate 119, thus causing switch 121 to couple the output terminal 123b of the switch 123 to the output terminal 121b thereby providing the altitude rate K, at the output of the maximum determining circuit 93, as the Uh dot limit for the limiter 66. The high level signal at the output of OR gate 115 also causes the switch 103 to couple to the low level logic signal at the terminal 103a thereby providing a low level signal at the inverting terminal of OR gate 115 and latching the switches so that the altitude rate K remains as the upper limit of the limiter 66 for the duration of the run.

The following explains the lower h dot limit, $L_h$ dot, and its computational flow. At initialization, assume that $-h_{err}$ dot was less than $-116.7$ FPS so that a high level logic signal was provided by the comparator 107 to the sample and hold circuit 201. Further assume that $-116.7$ FPS is less than the output of the minimum determining circuit 127, which takes the minimum of $L_h$ dot and $h_p$ dot, thereby making comparator 128 yield a low logic level to the input side of OR gate 129. In this situation, after inversion of the high level signal provided through switch 109, OR gate 129 couples a low level signal to the inverting terminal of AND gate 131. This low level signal also causes switch 133 to couple the past value of Lh dot via 126 to input terminal "a" of switch 135. If $h_p$ dot is greater than or equal to $L_h$ dot, comparator 137 couples a low level signal to AND gate 131 thereby providing a low level signal at the output thereof and causing switch 135 to couple the input terminal 135a to the output terminal 135b of switch 135 thereby holding the lower limit of the limiter 66, Lh dot, constant. It will stay this way until hp dot becomes less than Lh dot.

If $h_p$ dot is less than $L_h$ dot, the comparator 137 couples a high level signal to AND gate 131. This high level signal, and low level signal coupled to the inverting terminal, enters AND gate 131 creating a high level signal at the output thereof causing the switch 135 to couple the output terminal 135b to the second input terminal 135c, thereby making $L_h$ dot follow up on the value of $h_p$ dot, which is coupled to the second terminal 135c, at the output terminal of the switch 135 and establishing $h_p$ dot as the lower limit $L_h$ dot for the limiter 66. The lower limit of the limiter 66 tracks $h_p$ dot, a signal representative thereof being provided by the minimum determining circuit 127 to the comparator 128, until $h_p$ dot is greater than −116.7 FPS, at which time a high level signal is coupled to OR gate 129 from comparator 128, causing switch 109 to provide a low level signal at the output terminal 109b. This low level signal is inverted at the inverting terminal of OR gate 129 thereby latching the switch 109 to the input terminal 109b and the switch 133 to the input terminal 133a which is coupled to receive the −116.7 FPS altitude rate representative signal. The high level signal at the output terminal of OR gate 129 is also coupled to the inverting terminal of the AND gate 131 which now provides a low level logic signal causing the output terminal 135b to couple to the input terminal 133a of the switch 133 thereby providing the −116.7 FPS as the lower limit for the limiter 66 for the remainder of the run.

Referring again to FIG. 2, during each frame of the run the altitude $h_p$ provided at the output of the integrator 50 is coupled to amplifier 12 wherein the amplification factor $K_1$ converts the altitude $h_p$ to a velocity and couples the resulting velocity representative signal to terminal B of the switch 62. When the altitude rate at the terminal B decreases to less than the altitude rate at terminal A of the altitude rate at terminal B is less than three feet per second, the switch 62 is activated to couple terminal B to the summing circuit 64 replacing the non-linear loop between the output of the integrator 50 and the switch 62 with the linear loop comprising the amplifier 12. The forcing function generator 10 continues to operate in linear mode for the remainder of the run, exponentially decaying $h_p$ to zero.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. An altitude transition flight path capture apparatus for utilization with an aircraft autopilot to provide altitude control comprising:
    function means coupled to said autopilot for providing an altitude rate trajectory signal, an altitude trajectory signal, and a predicted altitude acceleration signal; and
    means coupled to receive said altitude rate trajectory signal, an altitude rate error signal, said altitude trajectory signal, and an altitude error signal for providing path error and path rate error signals to said autopilot for applying said path error and said path rate error for altitude control.

2. An apparatus in accordance with claim 1 wherein said function means includes non-linear means responsive to said altitude trajectory signal for providing a first velocity representative signal which is related to said altitude trajectory signal in a non-linear manner.

3. An apparatus in accordance with claim 2 wherein said function means includes:
    first summation means having a first input coupled to said non-linear means, a second input and an output at which signals representative of negative sums of signals coupled to said first and second inputs are provided;
    converting means coupled to said output port of said first summation means for converting a velocity representative signal to an acceleration representative signal and providing an acceleration representative signal between upper and lower variable acceleration representative signal limits;
    first limiter means for limiting velocity representative signals between upper and lower variable velocity limits;
    first integrator means coupled between said converting means and said first limiter means for integrating acceleration representative signals and providing velocity representative signals;
    second integrator means coupled between said first limiter means and said non-linear means and further coupled to said autopilot for providing said altitude trajectory signal; and
    means for coupling said first limiter means to said second input of said first summation means and to provide said altitude rate trajectory signal.

4. The apparatus of claim 3 further including means coupled to said converting means for providing said acceleraation representative signal as said predicted altitude rate signal to said autopilot.

5. An apparatus in accordance with claim 4 wherein said function means further includes;
    linear means responsive to said altitude trajectory signal for providing a second velocity representative signal which is related to said altitude trajectory signal in a linear manner; and
    switch means coupled to said first summation means, said non-linear means, and said linear means for coupling said non-linear means to said summation means when said first velocity representative signal is less than said second velocity representative signal and for coupling said linear means to said first summation means when said first velocity representative signal is greater than said second velocity representative signal.

6. The apparatus of claim 5 wherein said non-linear means includes:
    velocity means responsive to said altitude trajectory signal for providing a third velocity representative signal, said third velocity representative signal being related to said altitude trajectory signal in a non-linear manner;
    means for providing a reference signal; and
    second summation means having input means coupled to said velocity means and said reference signal means and having output means coupled to said switch means for providing said first velocity representative signal as a difference between said third velocity representative signal and said reference signal.

7. An apparatus in accordance with claim 6 wherein said reference signal means includes:

means for receiving said altitude error signal and said altitude rate error signal for providing an acceleration representative signal;

means for providing an acceleration to velocity conversion signal;

means responsive to said acceleration representative signal and said acceleration to velocity conversion signal for providing an altitude to velocity conversion signal;

second limiter means responsive to said altitude to velocity conversion signal for providing an altitude to velocity representative signal between upper and lower limits, said upper and lower limits being a function of said acceleration to velocity conversion signal; and amplifier means having amplification set as a function of said altitude to velocity representative signal coupled from said second limiter means, said amplifier means being responsive to said altitude signals for providing said reference velocity signal to second summation means.

8. An apparatus in accordance with claim 7 wherein said first and second integrators are initialized with initial values of said altitude rate error signal and said altitude error signal respectively.

9. An apparatus in accordance with claim 8 wherein said non-linear means further includes a variable gain amplifier having a gain in accordance with said altitude trajectory and said altitude rate trajectory.

10. The apparatus of claim 9 further including;

means responsive to said altitude error signal and said altitude rate error signal for providing an acceleration limit signal, said acceleration limit signal having a polarity which is opposite that of said altitude rate error signal;

first limit setting means coupled to said acceleration limit signal means and to said converting means for providing an upper limit signal to said converting means that is said acceleration limit signal limited between a first upper predetermined set limit and a first lower predetermined set limit when said polarity of said acceleration limit signal its positive and for providing an upper limit signal to said converting means that is equal to said first lower predetermined set limit when polarity of said acceleration limit signal is negative; and second limit setting means coupled to said acceleration limit signal means and to said converting means for providing a lower limit signal to said converting means that is said acceleration limit signal limited between a second upper predetermined set limit and a second lower predetermined set limit when said polarity of said acceleration limit signal is negative and for providing a lower limit signal to said converting means that is equal to said second upper predetermined set limit when said polarity of said acceleration is positive.

11. The apparatus of claim 10 wherein said second upper predetermined set limit is equal to minus said first lower predetermined set limit and said second lower predetermined set limit is equal to minus said first upper predetermined set limit.

12. The apparatus of claim 2 wherein said non-linear means includes:

velocity means responsive to said altitude trajectory signal for providing a second velocity representative signal, said second velocity representative signal being related to said altitude trajectory signal in a non-linear manner;

means for providing a reference signal; and summation means having input means coupled to said velocity means and said reference signal means and having output means coupled to said switch means for providing said first velocity representative signal as a difference between said second velocity representative signal and said reference signal.

13. An apparatus in accordance with claim 3 wherein said first and second integrators are initialized by an altitude rate error signal and an altitude error signal, respectively, provided by said autopilot.

14. An apparatus in accordance with claim 1 further including:

means coupled to receive aircraft speed and flight path characteristics representative signals for determining an aircraft altitude rate signal;

means for providing a predetermined altitude rate signal;

means responsive to said aircraft altitude rate signal, said altitude rate signal, and said predetermined altitude rate signal for providing logic signals; and means coupled to receive said aircraft altitude rate signal, said altitude rate error signal, and said predetermined altitude rate signal, responsive to said logic signals for selecting one of said aircraft altitude rate signal and said altitude rate error signal, as said upper rate limit of said first limiter means and for selecting one of said altitude rate signal, said aircraft altitude rate signal, and said predetermined altitude rate signal as said lower altitude rate limit of said first limiter means.

15. A method for capturing an altitude transition flight path for an aircraft autopilot comprising the steps of;

providing altitude rate error and altitude error signals from a flight management computer as initializing signals;

providing capture altitude, capture altitude rate, and altitude acceleration signals after initialization;

substracting said capture altitude signals from autopilot altitude signals and said capture altitude rate signals from said autopilot altitude rate signals to establish path error and path rate error signals for said autopilot; and providing said altitude acceleration signal as a feed forward trajectory signal for utilization to capture said altitude transition flight path with said autopilot.

16. A method in accordance with claim 15 wherein said step of providing said capture altitude rate and capture altitude signals includes the steps of:

providing a first altitude rate signal in a non-linear response to said altitude signal;

providing a second altitude rate signal in a linear response to said altitude signal;

providing a reference altitude rate signal;

establishing a difference between said first altitude rate signal and said reference altitude rate signal to establish a difference altitude rate signal;

selecting one of said difference altitude rate signal and said second altitude rate signal in accordance with relative levels thereof to provide a selected altitude rate signal;

summing said selected altitude rate signal and said capture altitude rate signal to provide a summed altitude rate signal;

converting said summed altitude rate signal to an altitude acceleration signal;

maintaining said altitude acceleration signal between upper and lower altitude acceleration limits;

integrating said altitude acceleration signal in a first integrator to provide an integrated altitude acceleration signal;

maintaining said integrated altitude acceleration signal within upper and lower altitude rate limits to establish said capture altitude rate signal; and integrating said capture altitude rate signal in a second integrator to establish said capture altitude signal.

17. The method of claim 16 wherein the step of providing a capture altitude signal in a non-linear response to said altitude signal includes the steps of:

determining a first gain maintained between upper and lower predetermined limits in response to said capture altitude rate and capture altitude signals;

amplifing said capture altitude signal by an amplifier having a gain in accordance with said first gain signal to establish an amplified signal;

multiplying said amplified signal by two to provide a multiplied signal; and taking a square root of said multiplied signal to provide a square root signal.

18. A method in accordance with claim 17 wherein said step of providing said reference signal includes the steps of:

providing a predetermined constant signal;

utilizing said altitude rate error and altitude error signals to provide a signal for division;

dividing said signal for division by said predetermined constant signal to establish a second gain;

providing predetermined limits for said second gain in accordance with said predetermined constant signal;

providing an amplifier having a gain established in accordance with said second gain; and amplifying a signal of unity amplitude in said amplifier to obtain said reference signal.

19. A method in accordance with claim 18 further including the step of utilizing said altitude rate error and said altitude error signals to establish said upper acceleration limit signal within first predetermined limits and said lower acceleration limit signal within second predetermined limits.

20. A method in accordance with claim 19 further including the step of selecting one of said altitude acceleration signal and a zero altitude acceleration representative signal as said feed forward trajectory signal in accordance with said difference altitude rate signal and said linear velocity signal, said altitude acceleration signal being selected when said difference altitude rate signal is greater than said linear velocity signal.

21. A method in accordance with claim 15 further including the step of selecting one of said altitude acceleration signal and a zero altitude acceleration representative signal as said feed forward trajectory signal in accordance with said difference altitude rate signal and said linear velocity signal, said altitude acceleration signal being selected when said difference altitude rate signal is greater than said linear velocity signal.

22. A method of claim 16 wherein the step of providing said altitude rate signal is a non-linear response to said capture altitude signal includes the steps of:

determining a first gain maintained between upper and lower predetermined limits in response to said capture altitude rate and capture altitude signals;

amplifing said capture altitude signal by an amplifier having a gain in accordance with first gain signal to establish an amplified signal;

multiplying said amplified signal by two to provide a multiplied signal; and taking a square root of said multiplied signal to provide a square root signal.

23. A method in accordance with claim 16 further including the step of utilizing said altitude rate error and said altitude error signals to establish said upper acceleration limit signal within first predetermined limits and said lower acceleration limit signal within second predetermined limits.

24. A method in accordance with claim 16 further including the step of initializing said first integrator with said altitude rate error signal.

25. A method in accordance with claim 24 further including the step of initializing said second integrator with said altitude error signal.

* * * * *